Figure 4:
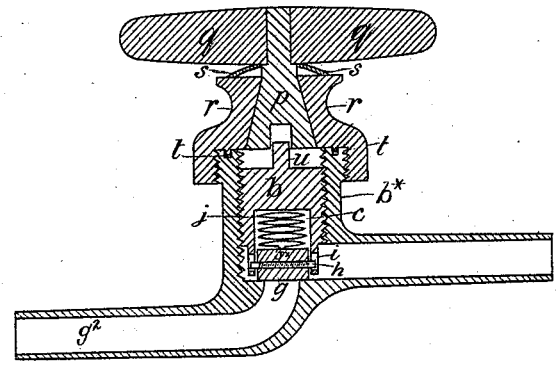

(No Model.) 2 Sheets—Sheet 1.
W. THOMSON.
VALVE FOR WATER, STEAM, &c.
No. 447,211. Patented Feb. 24, 1891.
FIG. 1. FIG. 2.
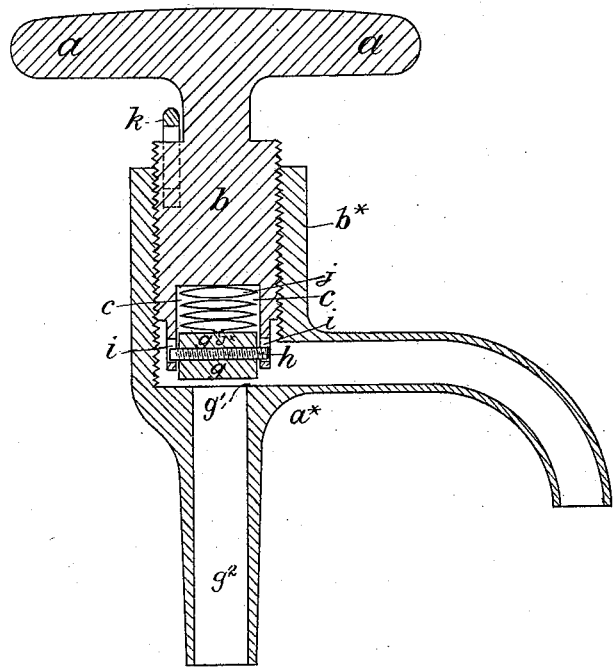 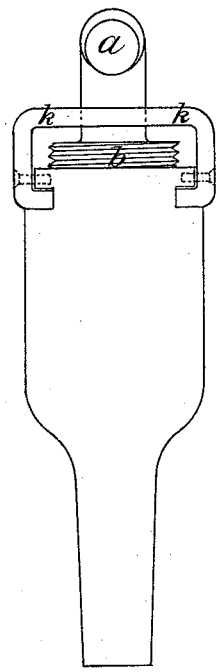
FIG. 3.
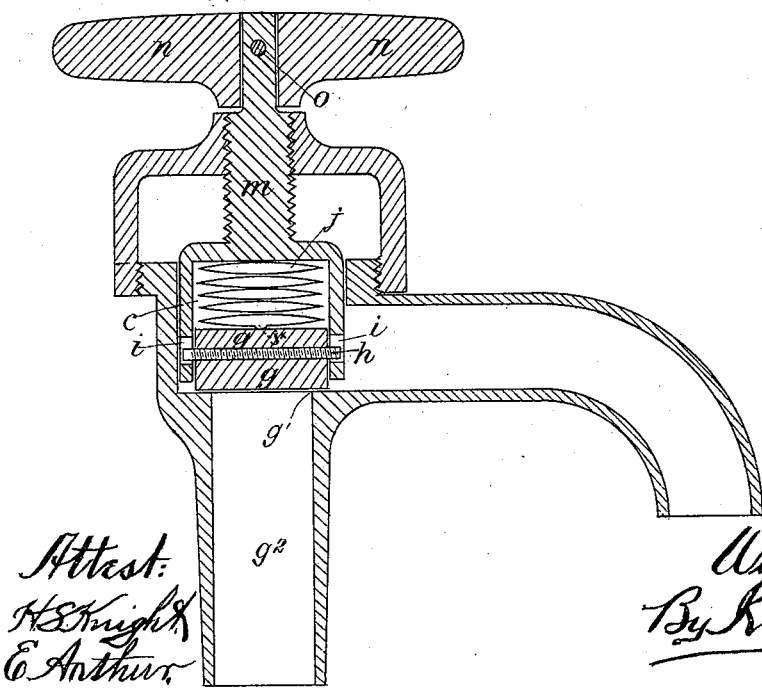

(No Model.) 2 Sheets—Sheet 2.

W. THOMSON.
VALVE FOR WATER, STEAM, &c.

No. 447,211. Patented Feb. 24, 1891.

Attest:
H. S. Knight
E. Arthur

Inventor
William Thomson
By Knight Bros.
Attys

UNITED STATES PATENT OFFICE.

WILLIAM THOMSON, OF GLASGOW, SCOTLAND.

VALVE FOR WATER, STEAM, &c.

SPECIFICATION forming part of Letters Patent No. 447,211, dated February 24, 1891.

Application filed March 25, 1889. Serial No. 304,673. (No model.) Patented in England March 30, 1889, No. 5,471; in Germany June 12, 1889, No. 50,959; in France June 18, 1889, No. 199,023; in Belgium June 19, 1889, No. 86,694; in India November 7, 1889, No. 298, and in Italy June 21, 1890, No. 420.

*To all whom it may concern:*

Be it known that I, Sir WILLIAM THOMSON, doctor of laws and professor of natural philosophy in the University and Colleges of Glasgow, a subject of the Queen of Great Britain, and a resident of Glasgow, in the county of Lanark, North Britain, have invented new and useful Improvements in Valves for Water, Steam, or other Liquids or Gases, of which the following is a specification.

My invention relates to improvements in valves for water, steam, or other liquids or gases, (for which I have obtained Letters Patent as follows, viz: in Germany June 12, 1889, No. 50,959; in France June 18, 1889, No. 199,023; in Belgium June 19, 1889, No. 86,694; in Italy June 21, 1890, No. 420; in India November 7, 1889, No. 298, and in Great Britain March 30, 1889, No. 5,471;) and the objects are, first, to allow the valve to be ground by rubbing it on its seat every time it is closed or opened, so as to automatically improve its fitting, if necessary, without disconnecting the apparatus; second, to provide a substitute for the fibrous or other non-metallic material in common use for stuffing boxes around the shaft, by which the valve is worked from outside. I attain these objects by the mechanism illustrated in the accompanying drawings.

Figures 1, 2, and 3 represent stop-cocks with the improved valve fulfilling the first and second objects. Fig. 1 is a vertical section, and Fig. 2 an elevation, as seen from the back. Fig. 3 is a vertical section of a similar stop-cock for larger construction of pipes. Fig. 4 is a vertical section of a stop-cock fulfilling the three objects.

Referring to Fig. 1, $a$ represents the handle or cross bar connected to the screw, plug, or stem $b$, which screws into an internally-threaded neck $b^x$ of the housing $a^x$. At the bottom of the screw there is a cavity or can or cup $c$, which contains an elastic packing $j$. This elastic packing is built up of a series of disks of metal, each slightly bent, and the lowermost one of the disks is embossed at its center, as shown at $j^x$, to secure that it shall press centrally on the valve $g$. The valve-seat $g'$ is arranged at the upper end of the inlet-port $g^2$, so that when the valve is closed there will be absolutely no leakage.

The valve $g$ consists of a thick flat disk of metal, which is also in the can $c$. There is a pin $h$ through the valve, the ends of which project beyond the valve at each side and work in the slots $i\ i$. This pin, working in the slots, keeps the valve in the mouth of the can and allows it to yield slightly into the can when the screw is turned, so as to press the valve against the seat, and also causes the valve to turn with the screw and rub on the seat. A stirrup is fixed to the stop-cock, as shown at $k$, Figs. 1 and 2, to prevent the valve being lifted too high. For larger diameters of pipe in which the construction shown in Fig. 1 would entail a screw of inconveniently large diameter, the arrangement shown in Fig. 3 is preferable. In this case the screw $m$ works in a cover screwed on the open top of the valve-chamber. The cross-handle $n$ may be fixed on the screw by any convenient and secure method. As shown in the drawings, the screw $m$ ends in a portion of square section slightly tapered, and a corresponding hole is made in the cross-handle $n$, the handle being forced home by pressure. A pin $o$ secures it firmly in its place. The valve and pin and spring washers in can are similar in this stop-cock to those already described, and are marked in Fig. 3 with the same letters as in Fig. 1.

When it is required to prevent the escape of fluid round the screw, I use a stop-cock, as represented in Fig. 4. A metal cone $p$, to which the cross-handle $q$ is attached, is kept pressed into its conical seat in the cover $r$ of the valve-chamber by means of a bent spring-washer $s$. A groove $t$ around the mouth of the valve-chamber and a corresponding feather in the face of the valve-cover provides a means of making a packed joint between the cover and the valve-chamber. A slot cut in the under face of the cone $p$ receives the end of a flat feather or projection $u$, in which the screw terminates, and so allows the screw to be turned by the cross-handle $q$, and at the same time allows the screws to move longitudinally in the operation of the valve. The valve and pin and spring washers in can are similar to those already described with reference to Fig. 1, and are marked in Fig. 4 with the same letters.

Instead of the bent springy disk hereinbefore referred to, the requisite elasticity may be obtained from other forms of spring or other elastic material, such as a metallic spiral spring.

I claim—

1. In a stop-cock, the combination, with the housing having inlet and outlet ports and a valve-seat arranged above the inlet-port, whereby the flow is prevented, said housing being provided with an internally-threaded neck, a cylindrical plug screwing into said neck and having a cup or cavity formed in its lower end, a valve arranged in said cup above the inlet-port and having pin-and-slot connection with the plug, and the elastic disks $j$, arranged in said cup above said valve and having the central boss $j^x$, whereby the said disks will hold the valve firmly upon its seat and prevent the flow, while at the same time the plug will turn the valve around, substantially as set forth.

2. The combination, with the housing having inlet and outlet ports and the valve-seat, of the valve-stem having a cup or cavity at its lower end, a valve arranged in said cup and having slot-and-pin connection with said stem, and an elastic packing arranged in said cup and having the central boss $j^x$ bearing upon said valve, substantially as set forth.

3. In a stop-cock, the combination, with the housing, a hollow cup screwed within said housing and having a prismatic projection at one end and a valve connected to the other end by feather-and-slot connection, and a spring bearing between said cup and valve, of a valve-stem having a prismatic socket in which said projection is seated, and a conical swell on said stem adapted to come in contact with the housing when the valve is open, substantially as and for the purposes set forth.

In testimony whereof I affix my signature in the presence of two subscribing witnesses.

WILLIAM THOMSON.

Witnesses:
   WILLIAM BOTTOMLEY,
      15 *University Gardens, Glasgow.*
   JOHN RENNIE,
      87 *Park Road, Glasgow.*